United States Patent [19]

Lindberg

[11] 4,203,696
[45] May 20, 1980

[54] TRAY UNLOADING DEVICE

[76] Inventor: Gunnar V. Lindberg, Vällingbyvägen 212, 162 21, Vällingby, Sweden

[21] Appl. No.: 858,345

[22] Filed: Dec. 7, 1977

Related U.S. Application Data

[63] Continuation of Ser. No. 605,292, Aug. 18, 1975, abandoned.

[51] Int. Cl.² .................. B65G 1/00; B65G 47/00; E04H 6/06
[52] U.S. Cl. .................. 414/331; 414/592; 414/609; 414/277; 414/280; 414/281; 414/285
[58] Field of Search .................. 214/16.4 R–16.4 C, 214/16.6, 16.1 C, 16.1 CB, 16.1 CC, 16.1 CF, 16.1 DB, 38 C, 44 R, 95 R, 301, 310

[56] References Cited

U.S. PATENT DOCUMENTS

| | | | |
|---|---|---|---|
| 1,737,762 | 12/1929 | Howe | 198/575 X |
| 2,869,739 | 1/1959 | Davis | 214/16.4 R |
| 3,719,288 | 3/1973 | Schmitt et al. | 214/16.4 C |
| 3,782,563 | 1/1974 | Brockmeyer et al. | 214/16.1 CE |
| 3,877,563 | 4/1975 | Hayashi | 198/429 X |

FOREIGN PATENT DOCUMENTS

| | | | |
|---|---|---|---|
| 2043243 | 3/1972 | Fed. Rep. of Germany | 214/16.4 C |
| 990101 | 4/1965 | United Kingdom | 214/16.4 R |

Primary Examiner—Robert G. Sheridan
Assistant Examiner—R. B. Johnson
Attorney, Agent, or Firm—LeBlanc, Nolan, Shur & Nies

[57] ABSTRACT

A tray unloading apparatus for transferring trays from a tray transport van to a horizontal in-feed station of a carry-away conveyor for carrying trays to further stations. The unloading apparatus includes vertical pillars which support a set of horizontal parallel tray guide tracks which are disposed essentially parallel to a plurality of vertical sets of tray rails in a tray transport van. The set of tray guide tracks are vertically shiftable along the pillars by a mechanical drive into different height positions corresponding to levels of the transport van rails. The uppermost height position is level with the in-feed station of the carry-away conveyor to receive a tray slid from the tray guide tracks at the upper level. A horizontal continuous belt conveyor located below and between the tray guide tracks is also vertically shiftable as a unit to a plurality of levels equal to the tray levels in the van, and is horizontally shiftable as a unit to be moved between and under any selected level of van tray rails to shift trays from the van to the tray guide tracks. Each time tray or trays at one level are transferred to the guide tracks they are raised to the upper level where a laterally shiftable tray shifter can engage and shift the lifted tray to the carry-away conveyor.

3 Claims, 2 Drawing Figures

TRAY UNLOADING DEVICE

This application is a continuation of application Ser. No. 605,292 filed Aug. 18, 1975, now abandoned.

The present invention relates to an automatic tray unloading device for unloading trays with pieces of service and possible food-leavings, emptied bakingplates or the like from a tray transport van to a conveyor means for further transport to for example a clearing conveyor in a dish washing room.

It is an object of the present invention to provide a tray unloading device which can be easily used together with conventional tray transport vans and which has a simple construction, a reliable function and a high operating speed and is capable of automatic operation.

A tray unloading device according to the invention for transferring trays, baking plates or the like from a tray transport van to a conveyor means is characterized by the fact, that it comprises at least one pair of horizontal guiding means located between first vertical side pillars, and under guidance by said first side pillars vertically moveable and adjustable into different height positions by mechanical driving means, the highest of said height positions being in level with said conveyor means, a horizontal outfeeding belt known per se located under said pair of guiding means and having a transport length corresponding to substantially twice the length of said pair of guiding means, said belt being mechanically, horizontally movable along vertical second side pillars a distance, which is substantially equal to the length of said pair of guiding means, to be displaced into and out of said tray transport van, said belt also being mechanically vertically movable and adjustable into different height positions depending on the height position of said pair of guiding means, and an unloading means located under or above the highest position of said pair of guiding means, said unloading means being movable in between said first side pillars and arranged to engage and displace a tray or trays or a baking plate or baking plates or the like on said pair of guiding means to said conveyor means.

The invention is illustrated by an embodiment shown as an example on the attached drawing.

Figure 1:
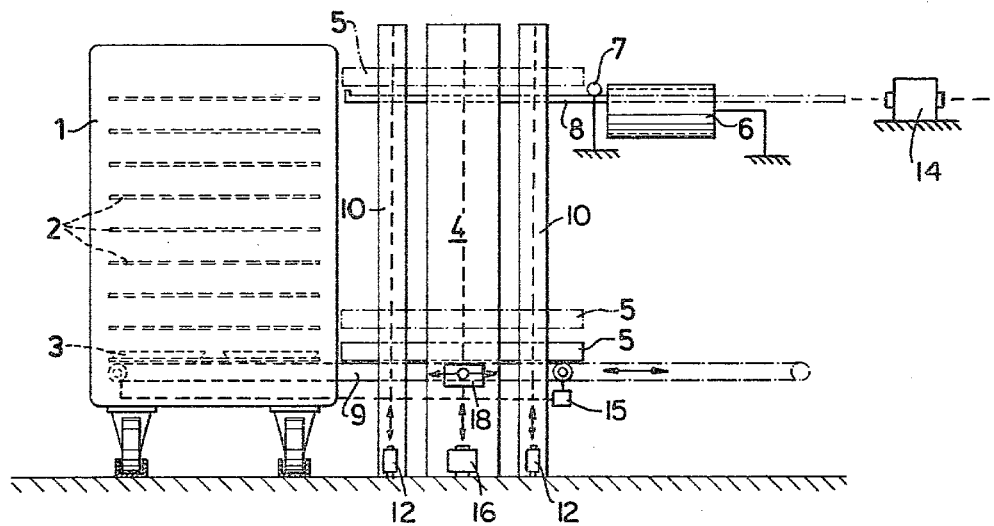
FIG. 1 is a side view of the tray unloading device according to the invention at a tray receiving station together with a tray transport van schematically illustrated.
Figure 2:
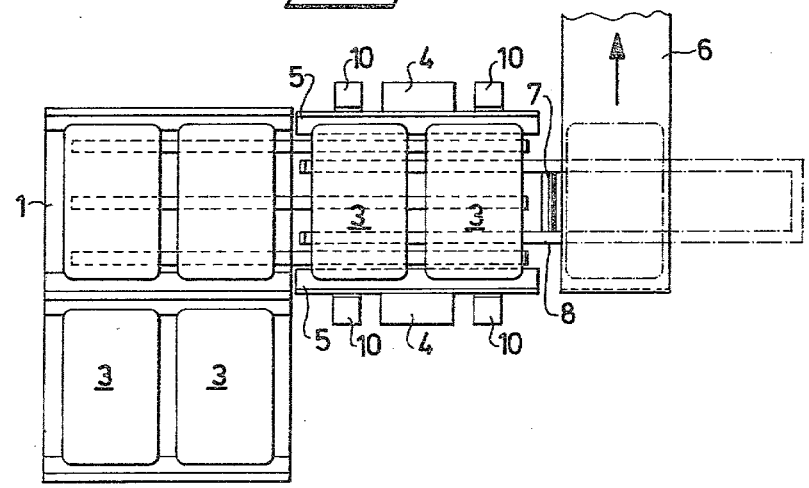
FIG. 2 shows the tray unloading device, the tray receiving station and the tray transport van as seen from above.

The construction of the tray unloading device shown on the drawing will be explained below together with a description of the function thereof. The tray transport van 1 is of conventional construction having horizontal pairs of rails or guiding means or the like 2 indicated by dashed lines and located above each other for receiving trays 3 for food, said trays being transported to a dish washing room with pieces of service, food-leavings and the like.

The tray transport van 1 is positioned with one side close to a tray unloading device comprising a pair of spaced vertical, first side pillars 4 and a pair of horizontal tray guiding means or tracks 5 located between said pillars 4 and vertically movable along and under guidance of said pillars. Said pair of guiding means 5 is constructed to support two trays 3 side by side. A driving device 16, for example a step motor driven chain driving device, a ball screw, a hydraulic driving device or the like, is disposed in said first side pillars 4. By said driving device the pair of guiding means 5 can be lowered and adjusted into level with each of the pairs of rails or the like 2 in the tray transport van, as indicated in FIG. 1 by the pair of guiding means 5 being shown in two low positions. By said driving device the pair of guiding means 5 can also be lifted to its highest position, which is in level with a carry-away transport means in form of an endless conveyor belt 6 extending to a tray receiving station, such as for example a clearing conveyor in a dish washing room.

At that side of the conveyor 6, which is adjacent to the pair of guiding means 5, there is a roll 7, the highest peripherial portion of which being located slightly higher than the upper portion of said conveyor. Close under said conveyor portion an unloading means 8 extends horizontally, said unloading means being illustrated schematically. Said unloading means can be called a horizontal tray shifter and comprises for example two arms connected to each other and having a somewhat greater length than the pair of guiding means 5, the ends of said unloading means most remote from said conveyor 6 being hook shaped. The unloading means 8 is mechanically displaceable by conventional driving means 14 between the positions indicated by full and dash-and-dot lines respectively.

One (or several parallel) horizontal, endless outfeeding belt or belts 9 having a belt driving device 15 is located under the pair of guiding means 5, said belt 9 being vertically movable on second side pillars 10 suitably by a similar driving device 12 as the device 16 for raising and lowering the pair of guiding means 5. Said belt 9 is somewhat narrower than the distance between the guiding means 5 and extends about as long as the double length of said pair of guiding means, whereby two trays can be carried by the belt, one after the other, in the feeding direction. Said belt 9 is in its lowest position horizontally displaceable a limited distance, by suitable mechanical shifting means 18, such limited displacement distance being about as long as the pair of guiding means 5, to and fro in the driving direction of the belt. Hereby the belt 9 can be located under the pair of guiding means 5 and to the right thereof as indicated by dash-and-dot lines in FIG. 1. The belt 9 can also be located under the pair of guiding means and to the left thereof as indicated by dashed lines, in which position the belt extends into the tray transport van.

When the tray transport van 1 is to be unloaded, the belt 9 is displaced into the van under the lowest pair of guiding means 5. The belt 9 is lifted a little, whereby the two trays on the pair of rails or the like 2 will be lifted and will rest on the belt 9. Thereafter the belt 9 is started, whereby the trays will be transferred to the pair of guiding means 5. The pair of guiding means 5 is lifted to its highest position in level with the conveyor 6. During this operation the unloading means 8 is displaced to its right position out of the way of the trays. Thereafter the unloading means 8 will be displaced in under the two trays and engage them when the pair of guiding means 5 is lowered. The unloading means 8 will thereafter, while moving to the right in the figures, displace a tray up on the roll 7, said roll facilitating the displacement, and over onto the conveyor 6 for further transport to the dish washing room. Hereafter the unloading means 8 can make a short break. The first tray on the conveyor 6 can be moved out of the way before the next tray is transferred to the conveyor 6.

Already when the pair of guiding means 5 is lifted, the belt 9 is lifted a step corresponding to the distance between two pairs of rails or the like 2 of the van 1. When the pair of guiding means 5 has been lowered to the level of the belt 9, said belt 9 will be started, and the trays thereon will be transferred to the pair of guiding means 5. Said pair of guiding means 5 will thereafter be lifted to its highest position, whereafter the unloading means 8 will start to operate again.

The unloading will proceed in the way described above successively step by step upwards, until all the trays in a vertical van portion have been unloaded and transferred to the conveyor 6. Thereafter the belt 9, which is lowered to its lowest position, will be moved to the right and thus removed out of the van 1. Thereafter the van and possible sliding doors therein can be moved, so that the next van portion will be located close to the tray unloading device to be unloaded.

The described movements can be completely automatically controlled relative each other by conventional control means (not shown).

The tray unloading device according to the invention has the advantage of being easily adaptable to conventional tray transport vans. Furthermore, the whole unloading operation can be made automatically and at a high speed, especially since the belt 9 can be moved to engage and keep the next two trays prepared in the van simultaneously as the pair of guiding means 5 is lifted, the unloading means 8 operates and the pair of guiding means 5 thereafter is lowered to the new position of the belt 9.

The invention is not restricted to the embodiment described and illustrated in the drawing, as it can be varied within the frame of the invention. For example the pair of guiding means 5 can be constructed to receive only one tray at a time, if the tray transport van has only one vertical column of trays or several vertical columns of trays after each other in a single line in the longitudinal direction of the van. The unloading means 8 can be disposed above the conveyor 6 and the pair of guiding means 5 in its highest position instead of below these parts. The conveyor belt 6 can be displaced by some other transport means, such as for example a more or less inclined plane. The tray transport van can have doors that can be swung up or its side can be easily made completely open in some other way. In that case the unloading device can be provided with two horizontal belts 9 side by side having the same movements as well as two pairs of guiding means 5 located side by side and simultaneously vertically movable, whereby two van portions, that is four columns of trays, can be unloaded at the same time.

What I claim is:

1. In combination, a tray transport van with vertically spaced apart pairs of horizontal tray rails, carry-away conveyor and a tray unloading apparatus for transferring trays from the vertically spaced apart pairs of horizontal tray rails in the tray transport van to a horizontal infeed station of the carry-away conveyor, the improvement comprising, in said unloading apparatus, a set of spaced apart vertical side pillars; a single set only of two laterally spaced apart parallel tray guide tracks mounted for vertical rectilinear movement on said vertical side pillars and disposed essentially horizontally; drive means connected to said set of tray guide tracks to vertically shift said set along one side of said pillars into a plurality of different vertical positions which correspond to the levels of transport van tray rails, the uppermost of the vertical positions being substantially level with the in-feed station of said carry-away conveyor so a tray can be laterally shifted from the tray guide tracks onto said carry-away conveyor at the upper level; a second set of vertical side pillars located adjacent said first mentioned set of side pillars; a horizontal outfeeding continuous belt conveyor located below and between said set of tray guide tracks and mounted on said second set of pillars for independent selective vertical and horizontal movement as a unit, vertically to a plurality of levels equal to the levels of trays in the van, and horizontally so that a portion of the continuous belt conveyor can be positioned into the van between the van tray rails and raised to any selected level of a pair of said van tray rails to engage and carry trays from the van to said set of vertically shiftable tray guide tracks; means for vertically shifting said belt conveyor; means for horizontally moving said belt conveyor as a unit; and means located adjacent the top portion of said vertical side pillars at the upper level position of said set of vertically shiftable tray guide tracks, comprising a laterally shiftable horizontal tray shifter to engage and shift any tray on the set of tray guide tracks to the in-feed station of said carry-away conveyor, and means for shifting said tray shifter.

2. A tray unloading apparatus as defined in claim 1, for transferring trays to a carry-away conveyor which is an endless belt conveyor disposed with the belt stretches normal to said set of tray guide tracks, said laterally shiftable tray shifter comprising a pair of horizontally reciprocable arms disposed to pass under the upper stretch of the carry-away conveyor and each arm having a hook on one end to seize a tray from said set of tray guide tracks at the said upper level position.

3. A tray unloading apparatus as defined in claim 1, wherein a horizontal tray transfer roll is located between said pillars and said carry-away conveyor in-feed station, the uppermost peripheral surface portion of said roll being located slightly higher than the tray receiving level of the carry-away conveyor at the in-feed station.

* * * * *